United States Patent
Hamada

(10) Patent No.: US 8,621,314 B2
(45) Date of Patent: Dec. 31, 2013

(54) TRANSMITTING AND RECEIVING SYSTEM AND METHOD, AND NON-TRANSITORY COMPUTER READABLE MEDIUM

(75) Inventor: Tsutomu Hamada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/603,124

(22) Filed: Sep. 4, 2012

(65) Prior Publication Data

US 2013/0227370 A1   Aug. 29, 2013

(30) Foreign Application Priority Data

Feb. 28, 2012   (JP) ................................. 2012-042242

(51) Int. Cl.
*H03M 13/00* (2006.01)
*G06F 11/00* (2006.01)

(52) U.S. Cl.
USPC ............................ 714/752; 714/776; 714/798

(58) Field of Classification Search
None
See application file for complete search history.

(56) References Cited

U.S. PATENT DOCUMENTS

| | | | | |
|---|---|---|---|---|
| 4,803,685 A | * | 2/1989 | Oget | 714/749 |
| 4,860,292 A | * | 8/1989 | Newman et al. | 714/748 |
| 5,072,449 A | * | 12/1991 | Enns et al. | 714/776 |
| 5,128,945 A | * | 7/1992 | Enns et al. | 714/776 |
| 5,282,215 A | * | 1/1994 | Hyodo et al. | 714/775 |
| 5,383,203 A | * | 1/1995 | Miyazono | 714/785 |
| 5,570,377 A | * | 10/1996 | Merino Gonzalez et al. | 714/785 |
| 5,608,738 A | * | 3/1997 | Matsushita | 714/752 |
| 6,226,769 B1 | * | 5/2001 | Schuster et al. | 714/752 |
| 6,243,846 B1 | * | 6/2001 | Schuster et al. | 714/776 |
| 6,556,588 B2 | * | 4/2003 | Wan et al. | 370/474 |
| 6,711,709 B1 | * | 3/2004 | York | 714/748 |
| 7,069,495 B2 | * | 6/2006 | Soderberg et al. | 714/776 |

FOREIGN PATENT DOCUMENTS

| | | |
|---|---|---|
| JP | 59-010056 A | 1/1984 |
| JP | 60-154746 A | 8/1985 |

OTHER PUBLICATIONS

Lee, Tammy, "PCI-SIG Board of Directors Approve PCI Express Specifications for High Performance Serial I/O" , News Release, http://www.pcisig.com/news_room/news/press_releases_archive/2002_07_23/2002_07_23.pdf, Jul. 23, 2002, Portland, OR.

* cited by examiner

*Primary Examiner* — Daniel McMahon
(74) *Attorney, Agent, or Firm* — Sughrue Mion, PLLC

(57) ABSTRACT

A transmitting and receiving system includes first and second transmitting and receiving apparatuses. The first transmitting and receiving apparatus includes a generating unit and a transmitting unit. The generating unit generates a packet for transmission by attaching packet identification information to transmission data to which an error detection code is attached, and uses, as the packet identification information, a code that is capable of detecting a 1-bit error caused by transmission of the packet for transmission. The transmitting unit converts the number of bits of the packet for transmission and transmits the converted packet. The second transmitting and receiving apparatus includes a receiving unit and a correcting unit. The receiving unit subjects the transmitted packet to inverse conversion of the number of bits. The correcting unit detects a 1-bit error in the packet identification information of the inverse-converted packet, and corrects the error.

4 Claims, 17 Drawing Sheets

FIG. 3A

|       | 1 bit | 2 bit | 3 bit | 4 bit | 5 bit | 6 bit | 7 bit | 8 bit | 9 bit | 10 bit |
|-------|-------|-------|-------|-------|-------|-------|-------|-------|-------|--------|
| D00.0 | D00.2 | D00.6 | NIT | NIT | NIT | NIT | NIT | NIT | NIT | NIT |
| D01.0 | D01.2 | D01.6 | NIT | NIT | NIT | NIT | NIT | NIT | NIT | NIT |
| D02.0 | D02.2 | D02.6 | NIT | NIT | NIT | NIT | NIT | NIT | NIT | NIT |
| D03.0 | D03.5 | D03.1 | NIT | NIT | NIT | NIT | NIT | NIT | NIT | NIT |
| D04.0 | D04.2 | D04.6 | NIT | NIT | NIT | NIT | NIT | NIT | NIT | NIT |
| D05.0 | D05.5 | D05.1 | NIT | NIT | NIT | NIT | NIT | NIT | NIT | NIT |
| D06.0 | D06.5 | D06.1 | NIT | NIT | NIT | NIT | NIT | NIT | NIT | NIT |
| D07.0 | D07.5 | D07.1 | NIT | NIT | NIT | NIT | NIT | NIT | NIT | NIT |
| D08.0 | D08.2 | D08.6 | NIT | NIT | NIT | NIT | NIT | NIT | NIT | NIT |
| D09.0 | D09.5 | D09.1 | NIT | NIT | NIT | NIT | NIT | NIT | NIT | NIT |
| D10.0 | D10.5 | D10.1 | NIT | NIT | NIT | NIT | NIT | NIT | NIT | NIT |
| D11.0 | D11.5 | D11.1 | NIT | NIT | NIT | NIT | NIT | NIT | NIT | NIT |
| D12.0 | D12.5 | D12.1 | NIT | NIT | NIT | NIT | NIT | NIT | NIT | NIT |
| D13.0 | D13.5 | D13.1 | NIT | NIT | NIT | NIT | NIT | NIT | NIT | NIT |
| D14.0 | D14.5 | D14.1 | NIT | NIT | NIT | NIT | NIT | NIT | NIT | NIT |
| D15.0 | D15.2 | D15.6 | NIT | NIT | NIT | NIT | NIT | NIT | NIT | NIT |
| D16.0 | D16.2 | D16.6 | NIT | NIT | NIT | NIT | NIT | NIT | NIT | NIT |
| D17.0 | D17.5 | D17.1 | NIT | NIT | NIT | NIT | NIT | NIT | NIT | NIT |
| D18.0 | D18.5 | D18.1 | NIT | NIT | NIT | NIT | NIT | NIT | NIT | NIT |
| D19.0 | D19.5 | D19.1 | NIT | NIT | NIT | NIT | NIT | NIT | NIT | NIT |
| D20.0 | D20.5 | D20.1 | NIT | NIT | NIT | NIT | NIT | NIT | NIT | NIT |
| D21.0 | D21.5 | D21.1 | NIT | NIT | NIT | NIT | NIT | NIT | NIT | NIT |
| D22.0 | D22.5 | D22.1 | NIT | NIT | NIT | NIT | NIT | NIT | NIT | NIT |
| D23.0 | D23.2 | D23.6 | NIT | NIT | NIT | NIT | NIT | NIT | NIT | NIT |
| D24.0 | D24.2 | D24.6 | NIT | NIT | NIT | NIT | NIT | NIT | NIT | NIT |
| D25.0 | D25.5 | D25.1 | NIT | NIT | NIT | NIT | NIT | NIT | NIT | NIT |
| D26.0 | D26.5 | D26.1 | NIT | NIT | NIT | NIT | NIT | NIT | NIT | NIT |
| D27.0 | D27.2 | D27.6 | NIT | NIT | NIT | NIT | NIT | NIT | NIT | NIT |
| D28.0 | D28.5 | D28.1 | NIT | NIT | NIT | NIT | NIT | NIT | NIT | NIT |
| D29.0 | D29.2 | D29.6 | NIT | NIT | NIT | NIT | NIT | NIT | NIT | NIT |
| D30.0 | D30.2 | D30.6 | NIT | NIT | NIT | NIT | NIT | NIT | NIT | NIT |
| D31.0 | D31.2 | D31.6 | NIT | NIT | NIT | NIT | NIT | NIT | NIT | NIT |

FIG. 3B

|       | 1 bit | 2 bit | 3 bit | 4 bit | 5 bit | 6 bit | 7 bit | 8 bit | 9 bit | 10 bit |
|-------|-------|-------|-------|-------|-------|-------|-------|-------|-------|--------|
| D00.1 | NIT   | NIT   | NIT   | D00.7 | D25.1 | D09.1 | D17.1 | NIT   | NIT   | NIT    |
| D01.1 | NIT   | NIT   | NIT   | D01.7 | D14.1 | NIT   | D06.1 | D10.1 | D12.1 | NIT    |
| D02.1 | NIT   | NIT   | NIT   | D02.7 | D13.1 | NIT   | D05.1 | D09.1 | NIT   | D12.1  |
| D03.1 | NIT   | D03.0 | D03.4 | NIT   | NIT   | D24.1 | D04.1 | D08.1 | NIT   | NIT    |
| D04.1 | NIT   | NIT   | NIT   | D04.7 | D11.1 | NIT   | D03.1 | NIT   | D09.1 | D10.1  |
| D05.1 | NIT   | D05.0 | D05.4 | NIT   | NIT   | D31.1 | D02.1 | NIT   | D08.1 | NIT    |
| D06.1 | NIT   | D06.0 | D06.4 | NIT   | NIT   | D16.1 | D01.1 | NIT   | NIT   | D08.1  |
| D07.1 | NIT   | D07.0 | D07.4 | NIT   | D08.1 | D23.1 | NIT   | NIT   | NIT   | NIT    |
| D08.1 | NIT   | NIT   | NIT   | D08.7 | D07.1 | NIT   | NIT   | D03.1 | D05.1 | D06.1  |
| D09.1 | NIT   | D09.0 | D09.4 | NIT   | NIT   | D00.1 | NIT   | D02.1 | D04.1 | NIT    |
| D10.1 | NIT   | D10.0 | D10.4 | NIT   | NIT   | D15.1 | NIT   | D01.1 | NIT   | D04.1  |
| D11.1 | NIT   | D11.0 | D11.4 | NIT   | D04.1 | D27.1 | NIT   | NIT   | NIT   | NIT    |
| D12.1 | NIT   | D12.0 | D12.4 | NIT   | NIT   | K28.1 | NIT   | NIT   | D01.1 | D02.1  |
| D13.1 | NIT   | D13.0 | D13.4 | NIT   | D02.1 | D29.1 | NIT   | NIT   | NIT   | NIT    |
| D14.1 | NIT   | D14.0 | D14.4 | NIT   | D01.1 | D30.1 | NIT   | NIT   | NIT   | NIT    |
| D15.1 | NIT   | NIT   | NIT   | D15.7 | D26.1 | D10.1 | D18.1 | NIT   | NIT   | NIT    |
| D16.1 | NIT   | NIT   | NIT   | D16.7 | D22.1 | D06.1 | NIT   | D18.1 | D20.1 | NIT    |
| D17.1 | NIT   | D17.0 | D17.4 | NIT   | NIT   | NIT   | D00.1 | D31.1 | D24.1 | NIT    |
| D18.1 | NIT   | D18.0 | D18.4 | NIT   | NIT   | NIT   | D15.1 | D16.1 | NIT   | D24.1  |
| D19.1 | NIT   | D19.0 | D19.4 | NIT   | D24.1 | NIT   | D27.1 | D23.1 | NIT   | NIT    |
| D20.1 | NIT   | D20.0 | D20.4 | NIT   | NIT   | NIT   | K28.1 | NIT   | D16.1 | D31.1  |
| D21.1 | NIT   | D21.0 | D21.4 | NIT   | D31.1 | NIT   | D29.1 | NIT   | D23.1 | NIT    |
| D22.1 | NIT   | D22.0 | D22.4 | NIT   | D16.1 | NIT   | D30.1 | NIT   | NIT   | D23.1  |
| D23.1 | K23.7 | NIT   | NIT   | D23.7 | NIT   | D07.1 | NIT   | D19.1 | D21.1 | D22.1  |
| D24.1 | NIT   | NIT   | NIT   | D24.7 | D19.1 | D03.1 | NIT   | NIT   | D17.1 | D18.1  |
| D25.1 | NIT   | D25.0 | D25.4 | NIT   | D00.1 | NIT   | NIT   | D29.1 | D27.1 | NIT    |
| D26.1 | NIT   | D26.0 | D26.4 | NIT   | D15.1 | NIT   | NIT   | D30.1 | NIT   | D27.1  |
| D27.1 | K27.7 | NIT   | NIT   | D27.7 | NIT   | D11.1 | D19.1 | NIT   | D25.1 | D26.1  |
| D28.1 | NIT   | D28.0 | D28.4 | NIT   | K28.1 | NIT   | NIT   | NIT   | D30.1 | D29.1  |
| D29.1 | K29.7 | NIT   | NIT   | D29.7 | NIT   | D13.1 | D21.1 | D25.1 | NIT   | D28.1  |
| D30.1 | K30.7 | NIT   | NIT   | D30.7 | NIT   | D14.1 | D22.1 | D26.1 | D28.1 | NIT    |
| D31.1 | NIT   | NIT   | NIT   | D31.7 | D21.1 | D05.1 | NIT   | D17.1 | NIT   | D20.1  |

FIG. 3C

|  | 1 bit | 2 bit | 3 bit | 4 bit | 5 bit | 6 bit | 7 bit | 8 bit | 9 bit | 10 bit |
|---|---|---|---|---|---|---|---|---|---|---|
| D00.2 | D00.0 | NIT | D00.7 | NIT | D25.2 | D09.2 | D17.2 | NIT | NIT | NIT |
| D01.2 | D01.0 | NIT | D01.7 | NIT | D14.2 | NIT | D06.2 | D10.2 | D12.2 | NIT |
| D02.2 | D02.0 | NIT | D02.7 | NIT | D13.2 | NIT | D05.2 | D09.2 | NIT | D12.2 |
| D03.2 | NIT | NIT | NIT | D03.4 | NIT | D24.2 | D04.2 | D08.2 | NIT | NIT |
| D04.2 | D04.0 | NIT | D04.7 | NIT | D11.2 | NIT | D03.2 | NIT | D09.2 | D10.2 |
| D05.2 | NIT | NIT | NIT | D05.4 | NIT | D31.2 | D02.2 | NIT | D08.2 | NIT |
| D06.2 | NIT | NIT | NIT | D06.4 | NIT | D16.2 | D01.2 | NIT | NIT | D08.2 |
| D07.2 | NIT | NIT | NIT | D07.4 | D08.2 | D23.2 | NIT | NIT | NIT | NIT |
| D08.2 | D08.0 | NIT | D08.7 | NIT | D07.2 | NIT | NIT | D03.2 | D05.2 | D06.2 |
| D09.2 | NIT | NIT | NIT | D09.4 | NIT | D00.2 | NIT | D02.2 | D04.2 | NIT |
| D10.2 | NIT | NIT | NIT | D10.4 | NIT | D15.2 | NIT | D01.2 | NIT | D04.2 |
| D11.2 | NIT | NIT | NIT | D11.4 | D04.2 | D27.2 | NIT | NIT | NIT | NIT |
| D12.2 | NIT | NIT | NIT | D12.4 | NIT | K28.2 | NIT | NIT | D01.2 | D02.2 |
| D13.2 | NIT | NIT | NIT | D13.4 | D02.2 | D29.2 | NIT | NIT | NIT | NIT |
| D14.2 | NIT | NIT | NIT | D14.4 | D01.2 | D30.2 | NIT | NIT | NIT | NIT |
| D15.2 | D15.0 | NIT | D15.7 | NIT | D26.2 | D10.2 | D18.2 | NIT | NIT | NIT |
| D16.2 | D16.0 | NIT | D16.7 | NIT | D22.2 | D06.2 | NIT | D18.2 | D20.2 | NIT |
| D17.2 | NIT | D17.7 | NIT | D17.4 | NIT | NIT | D00.2 | D31.2 | D24.2 | NIT |
| D18.2 | NIT | D18.7 | NIT | D18.4 | NIT | NIT | D15.2 | D16.2 | NIT | D24.2 |
| D19.2 | NIT | NIT | NIT | D19.4 | D24.2 | NIT | D27.2 | D23.2 | NIT | NIT |
| D20.2 | NIT | D20.7 | NIT | D20.4 | NIT | NIT | K28.2 | NIT | D16.2 | D31.2 |
| D21.2 | NIT | NIT | NIT | D21.4 | D31.2 | NIT | D29.2 | NIT | D23.2 | NIT |
| D22.2 | NIT | NIT | NIT | D22.4 | D16.2 | NIT | D30.2 | NIT | NIT | D23.2 |
| D23.2 | D23.0 | NIT | D23.7 | NIT | NIT | D07.2 | NIT | D19.2 | D21.2 | D22.2 |
| D24.2 | D24.0 | NIT | D24.7 | NIT | D19.2 | D03.2 | NIT | NIT | D17.2 | D18.2 |
| D25.2 | NIT | NIT | NIT | D25.4 | D00.2 | NIT | NIT | D29.2 | D27.2 | NIT |
| D26.2 | NIT | NIT | NIT | D26.4 | D15.2 | NIT | NIT | D30.2 | NIT | D27.2 |
| D27.2 | D27.0 | NIT | D27.7 | NIT | NIT | D11.2 | D19.2 | NIT | D25.2 | D26.2 |
| D28.2 | NIT | NIT | NIT | D28.4 | K28.2 | NIT | NIT | NIT | D30.2 | D29.2 |
| D29.2 | D29.0 | NIT | D29.7 | NIT | NIT | D13.2 | D21.2 | D25.2 | NIT | D28.2 |
| D30.2 | D30.0 | NIT | D30.7 | NIT | NIT | D14.2 | D22.2 | D26.2 | D28.2 | NIT |
| D31.2 | D31.0 | NIT | D31.7 | NIT | D21.2 | D05.2 | NIT | D17.2 | NIT | D20.2 |

FIG. 3D

| | 1 bit | 2 bit | 3 bit | 4 bit | 5 bit | 6 bit | 7 bit | 8 bit | 9 bit | 10 bit |
|---|---|---|---|---|---|---|---|---|---|---|
| D00.3 | D00.4 | D00.7 | NIT | NIT | NIT | NIT | NIT | NIT | NIT | NIT |
| D01.3 | D01.4 | D01.7 | NIT | NIT | NIT | NIT | NIT | NIT | NIT | NIT |
| D02.3 | D02.4 | D02.7 | NIT | NIT | NIT | NIT | NIT | NIT | NIT | NIT |
| D03.3 | D03.4 | D03.7 | NIT | NIT | NIT | NIT | NIT | NIT | NIT | NIT |
| D04.3 | D04.4 | D04.7 | NIT | NIT | NIT | NIT | NIT | NIT | NIT | NIT |
| D05.3 | D05.4 | D05.7 | NIT | NIT | NIT | NIT | NIT | NIT | NIT | NIT |
| D06.3 | D06.4 | D06.7 | NIT | NIT | NIT | NIT | NIT | NIT | NIT | NIT |
| D07.3 | D07.4 | D07.7 | NIT | NIT | NIT | NIT | NIT | NIT | NIT | NIT |
| D08.3 | D08.4 | D08.7 | NIT | NIT | NIT | NIT | NIT | NIT | NIT | NIT |
| D09.3 | D09.4 | D09.7 | NIT | NIT | NIT | NIT | NIT | NIT | NIT | NIT |
| D10.3 | D10.4 | D10.7 | NIT | NIT | NIT | NIT | NIT | NIT | NIT | NIT |
| D11.3 | D11.4 | D11.7 | NIT | NIT | NIT | NIT | NIT | NIT | NIT | NIT |
| D12.3 | D12.4 | D12.7 | NIT | NIT | NIT | NIT | NIT | NIT | NIT | NIT |
| D13.3 | D13.4 | D13.7 | NIT | NIT | NIT | NIT | NIT | NIT | NIT | NIT |
| D14.3 | D14.4 | D14.7 | NIT | NIT | NIT | NIT | NIT | NIT | NIT | NIT |
| D15.3 | D15.4 | D15.7 | NIT | NIT | NIT | NIT | NIT | NIT | NIT | NIT |
| D16.3 | D16.4 | D16.7 | NIT | NIT | NIT | NIT | NIT | NIT | NIT | NIT |
| D17.3 | D17.4 | NIT | NIT | NIT | NIT | NIT | NIT | NIT | NIT | NIT |
| D18.3 | D18.4 | NIT | NIT | NIT | NIT | NIT | NIT | NIT | NIT | NIT |
| D19.3 | D19.4 | D19.7 | NIT | NIT | NIT | NIT | NIT | NIT | NIT | NIT |
| D20.3 | D20.4 | NIT | NIT | NIT | NIT | NIT | NIT | NIT | NIT | NIT |
| D21.3 | D21.4 | D21.7 | NIT | NIT | NIT | NIT | NIT | NIT | NIT | NIT |
| D22.3 | D22.4 | D22.7 | NIT | NIT | NIT | NIT | NIT | NIT | NIT | NIT |
| D23.3 | D23.4 | D23.7 | NIT | NIT | NIT | NIT | NIT | NIT | NIT | NIT |
| D24.3 | D24.4 | D24.7 | NIT | NIT | NIT | NIT | NIT | NIT | NIT | NIT |
| D25.3 | D25.4 | D25.7 | NIT | NIT | NIT | NIT | NIT | NIT | NIT | NIT |
| D26.3 | D26.4 | D26.7 | NIT | NIT | NIT | NIT | NIT | NIT | NIT | NIT |
| D27.3 | D27.4 | D27.7 | NIT | NIT | NIT | NIT | NIT | NIT | NIT | NIT |
| D28.3 | D28.4 | D28.7 | NIT | NIT | NIT | NIT | NIT | NIT | NIT | NIT |
| D29.3 | D29.4 | D29.7 | NIT | NIT | NIT | NIT | NIT | NIT | NIT | NIT |
| D30.3 | D30.4 | D30.7 | NIT | NIT | NIT | NIT | NIT | NIT | NIT | NIT |
| D31.3 | D31.4 | D31.7 | NIT | NIT | NIT | NIT | NIT | NIT | NIT | NIT |

FIG. 3E

|       | 1 bit | 2 bit | 3 bit | 4 bit | 5 bit | 6 bit | 7 bit | 8 bit | 9 bit | 10 bit |
|-------|-------|-------|-------|-------|-------|-------|-------|-------|-------|--------|
| D00.4 | D00.3 | NIT   | D00.6 | D00.5 | NIT   | NIT   | NIT   | NIT   | NIT   | NIT    |
| D01.4 | D01.3 | NIT   | D01.6 | D01.5 | NIT   | NIT   | NIT   | NIT   | NIT   | NIT    |
| D02.4 | D02.3 | NIT   | D02.6 | D02.5 | NIT   | NIT   | NIT   | NIT   | NIT   | NIT    |
| D03.4 | D03.3 | NIT   | D03.1 | D03.2 | NIT   | NIT   | NIT   | NIT   | NIT   | NIT    |
| D04.4 | D04.3 | NIT   | D04.6 | D04.5 | NIT   | NIT   | NIT   | NIT   | NIT   | NIT    |
| D05.4 | D05.3 | NIT   | D05.1 | D05.2 | NIT   | NIT   | NIT   | NIT   | NIT   | NIT    |
| D06.4 | D06.3 | NIT   | D06.1 | D06.2 | NIT   | NIT   | NIT   | NIT   | NIT   | NIT    |
| D07.4 | D07.3 | NIT   | D07.1 | D07.2 | NIT   | NIT   | NIT   | NIT   | NIT   | NIT    |
| D08.4 | D08.3 | NIT   | D08.6 | D08.5 | NIT   | NIT   | NIT   | NIT   | NIT   | NIT    |
| D09.4 | D09.3 | NIT   | D09.1 | D09.2 | NIT   | NIT   | NIT   | NIT   | NIT   | NIT    |
| D10.4 | D10.3 | NIT   | D10.1 | D10.2 | NIT   | NIT   | NIT   | NIT   | NIT   | NIT    |
| D11.4 | D11.3 | NIT   | D11.1 | D11.2 | NIT   | NIT   | NIT   | NIT   | NIT   | NIT    |
| D12.4 | D12.3 | NIT   | D12.1 | D12.2 | NIT   | NIT   | NIT   | NIT   | NIT   | NIT    |
| D13.4 | D13.3 | NIT   | D13.1 | D13.2 | NIT   | NIT   | NIT   | NIT   | NIT   | NIT    |
| D14.4 | D14.3 | NIT   | D14.1 | D14.2 | NIT   | NIT   | NIT   | NIT   | NIT   | NIT    |
| D15.4 | D15.3 | NIT   | D15.6 | D15.5 | NIT   | NIT   | NIT   | NIT   | NIT   | NIT    |
| D16.4 | D16.3 | NIT   | D16.6 | D16.5 | NIT   | NIT   | NIT   | NIT   | NIT   | NIT    |
| D17.4 | D17.3 | NIT   | D17.1 | D17.2 | NIT   | NIT   | NIT   | NIT   | NIT   | NIT    |
| D18.4 | D18.3 | NIT   | D18.1 | D18.2 | NIT   | NIT   | NIT   | NIT   | NIT   | NIT    |
| D19.4 | D19.3 | NIT   | D19.1 | D19.2 | NIT   | NIT   | NIT   | NIT   | NIT   | NIT    |
| D20.4 | D20.3 | NIT   | D20.1 | D20.2 | NIT   | NIT   | NIT   | NIT   | NIT   | NIT    |
| D21.4 | D21.3 | NIT   | D21.1 | D21.2 | NIT   | NIT   | NIT   | NIT   | NIT   | NIT    |
| D22.4 | D22.3 | NIT   | D22.1 | D22.2 | NIT   | NIT   | NIT   | NIT   | NIT   | NIT    |
| D23.4 | D23.3 | NIT   | D23.6 | D23.5 | NIT   | NIT   | NIT   | NIT   | NIT   | NIT    |
| D24.4 | D24.3 | NIT   | D24.6 | D24.5 | NIT   | NIT   | NIT   | NIT   | NIT   | NIT    |
| D25.4 | D25.3 | NIT   | D25.1 | D25.2 | NIT   | NIT   | NIT   | NIT   | NIT   | NIT    |
| D26.4 | D26.3 | NIT   | D26.1 | D26.2 | NIT   | NIT   | NIT   | NIT   | NIT   | NIT    |
| D27.4 | D27.3 | NIT   | D27.6 | D27.5 | NIT   | NIT   | NIT   | NIT   | NIT   | NIT    |
| D28.4 | D28.3 | NIT   | D28.1 | D28.2 | NIT   | NIT   | NIT   | NIT   | NIT   | NIT    |
| D29.4 | D29.3 | NIT   | D29.6 | D29.5 | NIT   | NIT   | NIT   | NIT   | NIT   | NIT    |
| D30.4 | D30.3 | NIT   | D30.6 | D30.5 | NIT   | NIT   | NIT   | NIT   | NIT   | NIT    |
| D31.4 | D31.3 | NIT   | D31.6 | D31.5 | NIT   | NIT   | NIT   | NIT   | NIT   | NIT    |

FIG. 3F

|  | 1 bit | 2 bit | 3 bit | 4 bit | 5 bit | 6 bit | 7 bit | 8 bit | 9 bit | 10 bit |
|---|---|---|---|---|---|---|---|---|---|---|
| D00.5 | NIT | NIT | NIT | D00.4 | D25.5 | D09.5 | D17.5 | NIT | NIT | NIT |
| D01.5 | NIT | NIT | NIT | D01.4 | D14.5 | NIT | D06.5 | D10.5 | D12.5 | NIT |
| D02.5 | NIT | NIT | NIT | D02.4 | D13.5 | NIT | D05.5 | D09.5 | NIT | D12.5 |
| D03.5 | D03.0 | NIT | D03.7 | NIT | NIT | D24.5 | D04.5 | D08.5 | NIT | NIT |
| D04.5 | NIT | NIT | NIT | D04.4 | D11.5 | NIT | D03.5 | NIT | D09.5 | D10.5 |
| D05.5 | D05.0 | NIT | D05.7 | NIT | NIT | D31.5 | D02.5 | NIT | D08.5 | NIT |
| D06.5 | D06.0 | NIT | D06.7 | NIT | NIT | D16.5 | D01.5 | NIT | NIT | D08.5 |
| D07.5 | D07.0 | NIT | D07.7 | NIT | D08.5 | D23.5 | NIT | NIT | NIT | NIT |
| D08.5 | NIT | NIT | NIT | D08.4 | D07.5 | NIT | NIT | D03.5 | D05.5 | D06.5 |
| D09.5 | D09.0 | NIT | D09.7 | NIT | NIT | D00.5 | NIT | D02.5 | D04.5 | NIT |
| D10.5 | D10.0 | NIT | D10.7 | NIT | NIT | D15.5 | NIT | D01.5 | NIT | D04.5 |
| D11.5 | D11.0 | NIT | D11.7 | NIT | D04.5 | D27.5 | NIT | NIT | NIT | NIT |
| D12.5 | D12.0 | NIT | D12.7 | NIT | NIT | K28.5 | NIT | NIT | D01.5 | D02.5 |
| D13.5 | D13.0 | NIT | D13.7 | NIT | D02.5 | D29.5 | NIT | NIT | NIT | NIT |
| D14.5 | D14.0 | NIT | D14.7 | NIT | D01.5 | D30.5 | NIT | NIT | NIT | NIT |
| D15.5 | NIT | NIT | NIT | D15.4 | D26.5 | D10.5 | D18.5 | NIT | NIT | NIT |
| D16.5 | NIT | NIT | NIT | D16.4 | D22.5 | D06.5 | NIT | D18.5 | D20.5 | NIT |
| D17.5 | D17.0 | NIT | NIT | NIT | NIT | NIT | D00.5 | D31.5 | D24.5 | NIT |
| D18.5 | D18.0 | NIT | NIT | NIT | NIT | NIT | D15.5 | D16.5 | NIT | D24.5 |
| D19.5 | D19.0 | NIT | D19.7 | NIT | D24.5 | NIT | D27.5 | D23.5 | NIT | NIT |
| D20.5 | D20.0 | NIT | NIT | NIT | NIT | NIT | K28.5 | NIT | D16.5 | D31.5 |
| D21.5 | D21.0 | NIT | D21.7 | NIT | D31.5 | NIT | D29.5 | NIT | D23.5 | NIT |
| D22.5 | D22.0 | NIT | D22.7 | NIT | D16.5 | NIT | D30.5 | NIT | NIT | D23.5 |
| D23.5 | NIT | K23.7 | NIT | D23.4 | NIT | D07.5 | NIT | D19.5 | D21.5 | D22.5 |
| D24.5 | NIT | NIT | NIT | D24.4 | D19.5 | D03.5 | NIT | NIT | D17.5 | D18.5 |
| D25.5 | D25.0 | NIT | D25.7 | NIT | D00.5 | NIT | NIT | D29.5 | D27.5 | NIT |
| D26.5 | D26.0 | NIT | D26.7 | NIT | D15.5 | NIT | NIT | D30.5 | NIT | D27.5 |
| D27.5 | NIT | K27.7 | NIT | D27.4 | NIT | D11.5 | D19.5 | NIT | D25.5 | D26.5 |
| D28.5 | D28.0 | NIT | D28.7 | NIT | K28.5 | NIT | NIT | NIT | D30.5 | D29.5 |
| D29.5 | NIT | K29.7 | NIT | D29.4 | NIT | D13.5 | D21.5 | D25.5 | NIT | D28.5 |
| D30.5 | NIT | K30.7 | NIT | D30.4 | NIT | D14.5 | D22.5 | D26.5 | D28.5 | NIT |
| D31.5 | NIT | NIT | NIT | D31.4 | D21.5 | D05.5 | NIT | D17.5 | NIT | D20.5 |

FIG. 3G

|  | 1 bit | 2 bit | 3 bit | 4 bit | 5 bit | 6 bit | 7 bit | 8 bit | 9 bit | 10 bit |
|---|---|---|---|---|---|---|---|---|---|---|
| D00.6 | NIT | D00.0 | D00.4 | NIT | D25.6 | D09.6 | D17.6 | NIT | NIT | NIT |
| D01.6 | NIT | D01.0 | D01.4 | NIT | D14.6 | NIT | D06.6 | D10.6 | D12.6 | NIT |
| D02.6 | NIT | D02.0 | D02.4 | NIT | D13.6 | NIT | D05.6 | D09.6 | NIT | D12.6 |
| D03.6 | NIT | NIT | NIT | D03.7 | NIT | D24.6 | D04.6 | D08.6 | NIT | NIT |
| D04.6 | NIT | D04.0 | D04.4 | NIT | D11.6 | NIT | D03.6 | NIT | D09.6 | D10.6 |
| D05.6 | NIT | NIT | NIT | D05.7 | NIT | D31.6 | D02.6 | NIT | D08.6 | NIT |
| D06.6 | NIT | NIT | NIT | D06.7 | NIT | D16.6 | D01.6 | NIT | NIT | D08.6 |
| D07.6 | NIT | NIT | NIT | D07.7 | D08.6 | D23.6 | NIT | NIT | NIT | NIT |
| D08.6 | NIT | D08.0 | D08.4 | NIT | D07.6 | NIT | NIT | D03.6 | D05.6 | D06.6 |
| D09.6 | NIT | NIT | NIT | D09.7 | NIT | D00.6 | NIT | D02.6 | D04.6 | NIT |
| D10.6 | NIT | NIT | NIT | D10.7 | NIT | D15.6 | NIT | D01.6 | NIT | D04.6 |
| D11.6 | NIT | NIT | NIT | D11.7 | D04.6 | D27.6 | NIT | NIT | NIT | NIT |
| D12.6 | NIT | NIT | NIT | D12.7 | NIT | K28.6 | NIT | NIT | D01.6 | D02.6 |
| D13.6 | NIT | NIT | NIT | D13.7 | D02.6 | D29.6 | NIT | NIT | NIT | NIT |
| D14.6 | NIT | NIT | NIT | D14.7 | D01.6 | D30.6 | NIT | NIT | NIT | NIT |
| D15.6 | NIT | D15.0 | D15.4 | NIT | D26.6 | D10.6 | D18.6 | NIT | NIT | NIT |
| D16.6 | NIT | D16.0 | D16.4 | NIT | D22.6 | D06.6 | NIT | D18.6 | D20.6 | NIT |
| D17.6 | D17.7 | NIT | NIT | NIT | NIT | NIT | D00.6 | D31.6 | D24.6 | NIT |
| D18.6 | D18.7 | NIT | NIT | NIT | NIT | NIT | D15.6 | D16.6 | NIT | D24.6 |
| D19.6 | NIT | NIT | NIT | D19.7 | D24.6 | NIT | D27.6 | D23.6 | NIT | NIT |
| D20.6 | D20.7 | NIT | NIT | NIT | NIT | NIT | K28.6 | NIT | D16.6 | D31.6 |
| D21.6 | NIT | NIT | NIT | D21.7 | D31.6 | NIT | D29.6 | NIT | D23.6 | NIT |
| D22.6 | NIT | NIT | NIT | D22.7 | D16.6 | NIT | D30.6 | NIT | NIT | D23.6 |
| D23.6 | NIT | D23.0 | D23.4 | NIT | NIT | D07.6 | NIT | D19.6 | D21.6 | D22.6 |
| D24.6 | NIT | D24.0 | D24.4 | NIT | D19.6 | D03.6 | NIT | NIT | D17.6 | D18.6 |
| D25.6 | NIT | NIT | NIT | D25.7 | D00.6 | NIT | NIT | D29.6 | D27.6 | NIT |
| D26.6 | NIT | NIT | NIT | D26.7 | D15.6 | NIT | NIT | D30.6 | NIT | D27.6 |
| D27.6 | NIT | D27.0 | D27.4 | NIT | NIT | D11.6 | D19.6 | NIT | D25.6 | D26.6 |
| D28.6 | NIT | NIT | NIT | D28.7 | K28.6 | NIT | NIT | NIT | D30.6 | D29.6 |
| D29.6 | NIT | D29.0 | D29.4 | NIT | NIT | D13.6 | D21.6 | D25.6 | NIT | D28.6 |
| D30.6 | NIT | D30.0 | D30.4 | NIT | NIT | D14.6 | D22.6 | D26.6 | D28.6 | NIT |
| D31.6 | NIT | D31.0 | D31.4 | NIT | D21.6 | D05.6 | NIT | D17.6 | NIT | D20.6 |

FIG. 3H

|  | 1 bit | 2 bit | 3 bit | 4 bit | 5 bit | 6 bit | 7 bit | 8 bit | 9 bit | 10 bit |
|---|---|---|---|---|---|---|---|---|---|---|
| D00.7 | NIT | D00.3 | D00.2 | D00.1 | NIT | NIT | NIT | NIT | NIT | NIT |
| D01.7 | NIT | D01.3 | D01.2 | D01.1 | NIT | NIT | NIT | NIT | NIT | NIT |
| D02.7 | NIT | D02.3 | D02.2 | D02.1 | NIT | NIT | NIT | NIT | NIT | NIT |
| D03.7 | NIT | D03.3 | D03.5 | D03.6 | NIT | NIT | NIT | NIT | NIT | NIT |
| D04.7 | NIT | D04.3 | D04.2 | D04.1 | NIT | NIT | NIT | NIT | NIT | NIT |
| D05.7 | NIT | D05.3 | D05.5 | D05.6 | NIT | NIT | NIT | NIT | NIT | NIT |
| D06.7 | NIT | D06.3 | D06.5 | D06.6 | NIT | NIT | NIT | NIT | NIT | NIT |
| D07.7 | NIT | D07.3 | D07.5 | D07.6 | NIT | NIT | NIT | NIT | NIT | NIT |
| D08.7 | NIT | D08.3 | D08.2 | D08.1 | NIT | NIT | NIT | NIT | NIT | NIT |
| D09.7 | NIT | D09.3 | D09.5 | D09.6 | NIT | NIT | NIT | NIT | NIT | NIT |
| D10.7 | NIT | D10.3 | D10.5 | D10.6 | NIT | NIT | NIT | NIT | NIT | NIT |
| D11.7 | NIT | D11.3 | D11.5 | D11.6 | NIT | NIT | NIT | NIT | NIT | NIT |
| D12.7 | NIT | D12.3 | D12.5 | D12.6 | NIT | NIT | NIT | NIT | NIT | NIT |
| D13.7 | NIT | D13.3 | D13.5 | D13.6 | NIT | NIT | NIT | NIT | NIT | NIT |
| D14.7 | NIT | D14.3 | D14.5 | D14.6 | NIT | NIT | NIT | NIT | NIT | NIT |
| D15.7 | NIT | D15.3 | D15.2 | D15.1 | NIT | NIT | NIT | NIT | NIT | NIT |
| D16.7 | NIT | D16.3 | D16.2 | D16.1 | NIT | NIT | NIT | NIT | NIT | NIT |
| D17.7 | D17.6 | D17.2 | NIT | NIT | NIT | NIT | NIT | NIT | NIT | NIT |
| D18.7 | D18.6 | D18.2 | NIT | NIT | NIT | NIT | NIT | NIT | NIT | NIT |
| D19.7 | NIT | D19.3 | D19.5 | D19.6 | NIT | NIT | NIT | NIT | NIT | NIT |
| D20.7 | D20.6 | D20.2 | NIT | NIT | NIT | NIT | NIT | NIT | NIT | NIT |
| D21.7 | NIT | D21.3 | D21.5 | D21.6 | NIT | NIT | NIT | NIT | NIT | NIT |
| D22.7 | NIT | D22.3 | D22.5 | D22.6 | NIT | NIT | NIT | NIT | NIT | NIT |
| D23.7 | NIT | D23.3 | D23.2 | D23.1 | NIT | NIT | NIT | NIT | NIT | NIT |
| D24.7 | NIT | D24.3 | D24.2 | D24.1 | NIT | NIT | NIT | NIT | NIT | NIT |
| D25.7 | NIT | D25.3 | D25.5 | D25.6 | NIT | NIT | NIT | NIT | NIT | NIT |
| D26.7 | NIT | D26.3 | D26.5 | D26.6 | NIT | NIT | NIT | NIT | NIT | NIT |
| D27.7 | NIT | D27.3 | D27.2 | D27.1 | NIT | NIT | NIT | NIT | NIT | NIT |
| D28.7 | NIT | D28.3 | D28.5 | D28.6 | NIT | NIT | NIT | NIT | NIT | NIT |
| D29.7 | NIT | D29.3 | D29.2 | D29.1 | NIT | NIT | NIT | NIT | NIT | NIT |
| D30.7 | NIT | D30.3 | D30.2 | D30.1 | NIT | NIT | NIT | NIT | NIT | NIT |
| D31.7 | NIT | D31.3 | D31.2 | D31.1 | NIT | NIT | NIT | NIT | NIT | NIT |

FIG. 4

|       | Dxx.0 | Dxx.1 | Dxx.2 | Dxx.3 | Dxx.4 | Dxx.5 | Dxx.6 | Dxx.7 |
|-------|-------|-------|-------|-------|-------|-------|-------|-------|
| Dxx.0 | ◎     | ○     | ○     |       |       | ○     | ○     |       |
| Dxx.4 |       | ○     | ○     | ○     | ◎     |       | ○     |       |
| Dxx.7 |       | ○     | ○     | ○     |       | ○     | ○     | ◎     |

US 8,621,314 B2

TRANSMITTING AND RECEIVING SYSTEM AND METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-042242 filed Feb. 28, 2012.

BACKGROUND

1. Technical Field

The present invention relates to a transmitting and receiving system and method, and to a non-transitory computer readable medium.

2. Summary

According to an aspect of the invention, there is provided a transmitting and receiving system including a first transmitting and receiving apparatus and a second transmitting and receiving apparatus. The first transmitting and receiving apparatus includes a generating unit and a transmitting unit. The generating unit generates a packet for transmission by attaching packet identification information to transmission data to which an error detection code is attached, and uses, as the packet identification information, a code that is capable of detecting a 1-bit error caused by transmission in transmission of the packet for transmission. The transmitting unit converts the number of bits of the packet for transmission and transmits the converted packet for transmission. The second transmitting and receiving apparatus includes a receiving unit and a correcting unit. The receiving unit subjects the packet for transmission, which has been transmitted by the transmitting unit of the first transmitting and receiving apparatus, to inverse conversion of the number of bits. The correcting unit detects a 1-bit error in the packet identification information of the packet for transmission, which has been subjected to inverse conversion of the number of bits by the receiving unit, and corrects the error.

BRIEF DESCRIPTION OF THE DRAWINGS

Exemplary embodiments of the present invention will be described in detail based on the following figures, wherein:

FIG. 3A is a diagram illustrating 8B/10B inverse-converted patterns corresponding to ten patterns of errors;

FIG. 3B is a diagram illustrating 8B/10B inverse-converted patterns corresponding to ten patterns of errors;

FIG. 3C is a diagram illustrating 8B/10B inverse-converted patterns corresponding to ten patterns of errors;

FIG. 3D is a diagram illustrating 8B/10B inverse-converted patterns corresponding to ten patterns of errors;

FIG. 3E is a diagram illustrating 8B/10B inverse-converted patterns corresponding to ten patterns of errors;

FIG. 3F is a diagram illustrating 8B/10B inverse-converted patterns corresponding to ten patterns of errors;

FIG. 3G is a diagram illustrating 8B/10B inverse-converted patterns corresponding to ten patterns of errors;

FIG. 3H is a diagram illustrating 8B/10B inverse-converted patterns corresponding to ten patterns of errors;

FIG. 4 is a table representing error patterns in FIGS. 3A, 3E, and 3H in terms of the relationship between transmission data and reception data;

DETAILED DESCRIPTION

Figure 1:
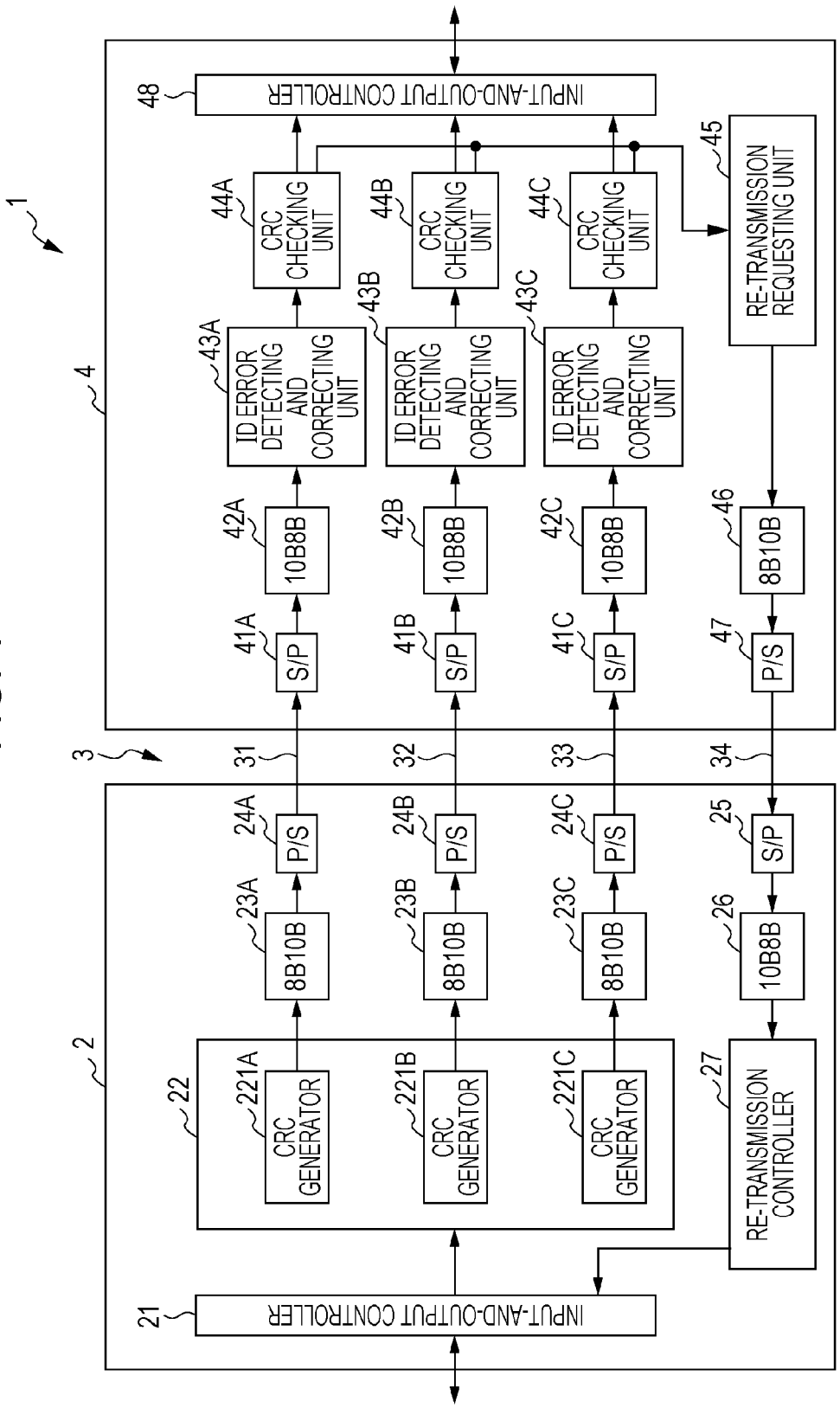
FIG. 1 is a block diagram illustrating an example of the configuration of a transmitting and receiving system according to a first exemplary embodiment of the invention.

Hereinafter, exemplary embodiments of the invention will be described with reference to the drawings. In the drawings, components that have substantially the same functions are given the same reference numerals, and overlapping descriptions thereof will be omitted.

First Exemplary Embodiment

FIG. 1 is a block diagram illustrating an example of the configuration of a transmitting and receiving system according to a first exemplary embodiment of the invention. A transmitting and receiving system 1 includes a first transmitting and receiving apparatus 2, and a second transmitting and receiving apparatus 4, which are connected to each other by a transmission path 3 for serially transmitting and receiving information. The transmission path 3 includes a first lane 31, a second lane 32, a third lane 33, and a fourth lane 34.

Configuration of First Transmitting and Receiving Apparatus

The first transmitting and receiving apparatus 2 includes an input-and-output controller 21; a transmission packet generator 22, 8B/10B converters (8B10B) 23A, 23B, and 23C, and parallel/serial converters (P/S) 24A, 24B, and 24C, which are provided corresponding to the first lane 31, the second lane 32, and the third lane 33; and a serial/parallel converter (S/P) 25, a 10B/8B converter (10B8B) 26, and a re-transmission controller 27, which are provided corresponding to the fourth lane 34. The transmission packet generator 22 is an example of a generating unit. The 8B/10B converters 23A, 23B, and 23C and the parallel/serial converters 24A, 24B, and 24C are examples of a transmitting unit. The serial/parallel converter 25 and the 10B/8B converter 26 are examples of a receiving unit.

Configuration of Second Transmitting and Receiving Apparatus

The second transmitting and receiving apparatus 4 includes serial/parallel converters (S/P) 41A, 41B, and 41C, 10B/8B converters (10B8B) 42A, 42B, and 42C, ID error detecting and correcting units 43A, 43B, and 43C, and CRC units 44A, 44B, and 44C, which are provided corresponding to the first lane 31, the second lane 32, and the third lane 33; a re-transmission requesting unit 45, an 8B/10B converter (8B10B) 46, and a parallel/serial converter (P/S) 47, which are provided corresponding to the fourth lane 34; and an input-and-output controller 48. The serial/parallel converters 41A, 41B, and 41C and the 10B/8B converters 42A, 42B, and 42C are examples of a receiving unit. The ID error detecting and correcting units 43A, 43B, and 43C are examples of a correcting unit. The CRC units 44A, 44B, and 44C are examples of a detecting unit. The 8B/10B converter 46 and the parallel/serial converter 47 are examples of a transmitting unit.

Transmission Path

In the first exemplary embodiment, electrical cables that transmit electrical signals are used as the transmission path 3. Alternatively, optical cables that transmit optical signals may be used as the transmission path 3. When optical cables are used, photoelectric converters need to be provided at a transmitting side and a receiving side. Each of the lanes 31, 32, 33, and 34 constituting the transmission path 3 includes two lines. These two lines may be a differential transmission line that transmits differential signals. The number of lanes constituting the transmission path 3 is not limited to four.

Configuration of Each Part of First and Second Transmitting and Receiving Apparatuses The input-and-output controller 21 of the first transmitting and receiving apparatus 2 exchanges data with, for example, a reproducing apparatus. The input-and-output controller 48 of the second transmitting and receiving apparatus 4 exchanges data with, for example, a video display apparatus. The input-and-output controller 21 of the first transmitting and receiving apparatus 2 has a transmission buffer (not illustrated) that holds transmitted data for a predetermined time. The transmitted data may be held until a positive acknowledgment (ACK) is received. Data may be exchanged not only with the reproducing apparatus and the video display apparatus, but also with an image data generating apparatus and an image forming apparatus.

The transmission packet generator 22 of the first transmitting and receiving apparatus 2 includes CRC generators 221A, 221B, and 221C provided corresponding to the first lane 31, the second lane 32, and the third lane 33. The transmission packet generator 22 arranges data to be transferred (transmission data), such as image information, into a packet to generate a transmission packet. The transmission packet generator 22 uses, as a sequence identification (ID) that specifies the transmission packet, a code that is capable of detecting a 1-bit error in the sequence ID caused by transmission in transmission of the transmission packet. The transmission packet generator 22 uses, as a sequence ID, plural predetermined codes in a predetermined order. The transmission packet will be described in detail later. The transmission packet is an example of a packet for transmission.

The re-transmission controller 27 of the first transmitting and receiving apparatus 2 gives a re-transmission instruction to the input-and-output controller 21 in response to a re-transmission request transmitted from the second transmitting and receiving apparatus 4 to the first transmitting and receiving apparatus 2.

The 8B/10B converters 23A, 23B, and 23C of the first transmitting and receiving apparatus 2 and the 8B/10B converter 46 of the second transmitting and receiving apparatus 4 convert the number of bits from 8-bit to 10-bit, as an 8B/10B conversion, and output data in units of 10 bits. Using a conversion table, the 10B/8B converter 26 of the first transmitting and receiving apparatus 2 and the 10B/8B converters 42A, 42B, and 42C of the second transmitting and receiving apparatus 4 perform 8B/10B inverse conversion (10B/8B conversion) of 10-bit data, which is inverse conversion of the number of bits, and output data in units of 8 bits. 8B/10B conversion is for performing DC balance adjustment so that 0s and 1s are moderately included in the transmission data. In a system known as 8B/10B conversion, the bulk of data in units of 8 bits is converted into 10-bit data where the ratio between 0s and is close to 50%, which is determined in advance, thereby adjusting the DC balance.

The parallel/serial converters 24A, 24B, and 24C of the first transmitting and receiving apparatus 2 and the parallel/serial converter 47 of the second transmitting and receiving apparatus 4 convert parallel data into serial data (P/S conversion) and output the serial data, and have registers for setting, as default settings at the time of power ON, for example, a de-emphasis that attenuates DC components of signal waveforms, a pre-emphasis that emphasizes high-frequency components of signal waveforms, and a differential voltage.

The serial/parallel converter 25 of the first transmitting and receiving apparatus 2 and the serial/parallel converters 41A, 41B, and 41C of the second transmitting and receiving apparatus 4 convert serial data into parallel data (S/P conversion), and have registers for setting, as a default setting at the time of power ON, for example, an equalizer that compensates for deterioration of signal waveforms occurring in the transmission path 3.

In the normal mode, the ID error detecting and correcting units 43A, 43B, and 43C detect sequence ID errors (hereinafter will be referred to as "ID errors") when plural codes, such as D0.0 to D31.0, D0.4 to D31.4, and D0.7 to D31.7, which are determined in advance as sequence IDs for specifying transmission packets that are transmitted one after another, are not used in a predetermined order, and correct the ID errors to correct sequence IDs on the basis of the predetermined codes and the predetermined order. The operation of the ID error detecting and correcting units 43A, 43B, and 43C in the re-transmission mode and the re-re-transmission mode will be described in detail later.

The CRC units 44A, 44B, and 44C extract data from the transmission packet transmitted from the first transmitting and receiving apparatus 2, and check the CRC. If there is no CRC error, the CRC units 44A, 44B, and 44C merge the data and output the data to the input-and-output controller 48. If there is a CRC error, the CRC units 44A, 44B, and 44C send a notification indicating the error, together with the sequence ID for specifying the transmission packet, to the re-transmission requesting unit 45.

Upon receipt of the CRC error notification from the CRC units 44A, 44B, and 44C, the re-transmission requesting unit 45 generates a packet for requesting re-transmission, and sends the generated packet to the first transmitting and receiving apparatus 2. The packet for requesting re-transmission includes a header indicating that the packet is for requesting re-transmission, and the sequence ID of a packet requested to be re-transmitted.

The components of the first and second transmitting and receiving apparatuses 2 and 4 may be partially or entirely configured using hardware circuits, such as field programmable gate arrays (FPGAs) and application specific integrated circuits (ASICs). Alternatively, the components of the first and second transmitting and receiving apparatuses 2 and 4 (except for S/P and P/S converters) may be realized at each of computers in the first and second transmitting and receiving apparatuses 2 and 4 by causing a central processing unit (CPU) to operate in accordance with a program such as that illustrated in FIGS. 5A and 5B, which will be described later.

Structure of Transmission Packet

Figure 2:
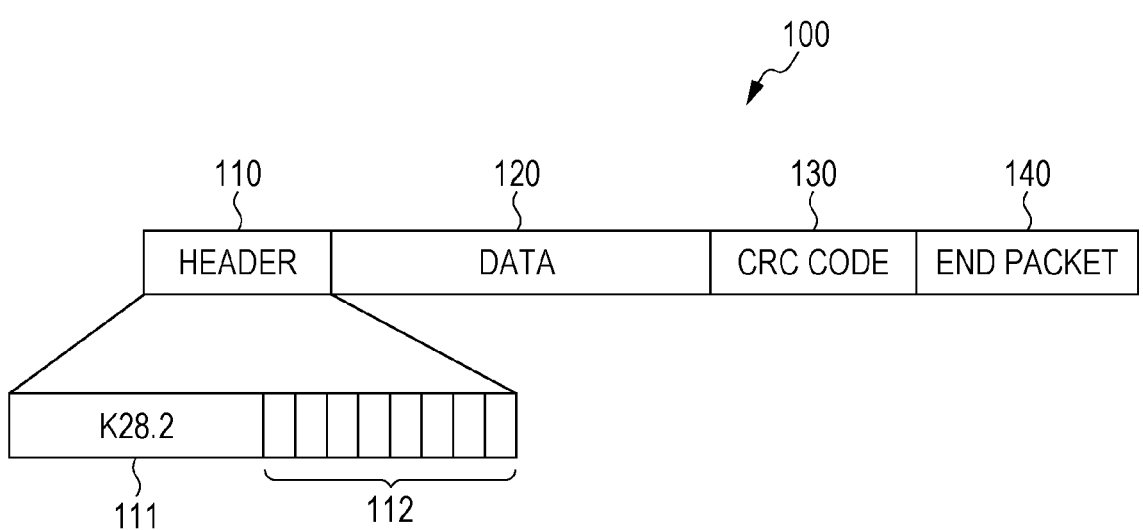
FIG. 2 is a diagram illustrating an example of the configuration of a transmission packet according to the first exemplary embodiment.

FIG. 2 illustrates an example of the configuration of a transmission packet generated by the transmission packet generator 22 of the first transmitting and receiving apparatus 2. A transmission packet 100 has a fixed length, and includes a 2-byte header 110, 256-byte data 120, a 2-byte CRC code 130, and a 2-byte end packet 140 indicating the end of the transmission packet 100. The header 110 includes a start packet 111 including a K code, such as K28.2, which indicates the beginning of the transmission packet 100, and an 8-bit sequence ID 112. The sequence ID 112 is an example of identification information of the transmission packet 100. The CRC code 130 is an example of an error detection code.

The CRC generators 221A, 221B, and 221C generate a CRC code 130 by performing calculation on the basis of transmission data. The transmission packet generator 22 generates the transmission packet 100 by attaching the header 110, the CRC code 130 generated by the CRC generators 221A, 221B, and 221C, and the end packet 140 to the transmission data 120.

Patterns of Errors

Referring now to FIGS. 3A to 3H, patterns of errors of the sequence ID 112 will be described. FIGS. 3A to 3H illustrate 8B/10B inverse-converted reception data, corresponding to ten patterns of errors. In FIGS. 3A to 3H, D00.0 to D31.7 on the left side column indicate transmission data before being subjected to 8B/10B conversion, and 1 bit to 10 bit indicate the bit positions from the beginning where errors have occurred.

When 8-bit data is to be transmitted, after being subjected to 8B/10B conversion, the 8-bit data becomes 10-bit data. The probability of this 10-bit data having a 1-bit error has ten patterns. When data is Dxx.y, xx corresponds to the 5 least significant bits of 0 to 31, and y corresponds to the 3 most significant bits of 0 to 7.

Errors include those in the sequence ID 112 (ID errors) and those in the CRC code 130 (hereinafter will be referred to as "CRC errors"). In addition, errors include two types: errors in which data is encoded to a different code though there is corresponding data in the conversion table; and errors in which there is no corresponding data in the conversion table (not in table or NIT). For example, referring to FIG. 3A, when transmission data D00.0 is converted from 8-bit data to 10-bit data, if an error occurs in the first bit at the beginning, D00.0 is converted to D00.2 reception data. When transmission data D00.0 is converted from 8-bit data to 10-bit data, if an error occurs in the third bit from the beginning, since there is no corresponding data in the conversion table, the result becomes an NIT error.

FIG. 4 is a table representing error patterns in FIGS. 3A, 3E, and 3H in terms of the relationship between transmission data and reception data. In FIG. 4, the double circle indicates the correct reception data, and the single circle indicates reception data in which a 1-bit error has occurred. When Dxx.0 is transmitted as transmission data, as is clear from FIG. 3A, Dxx.0, Dxx.1, Dxx.2, Dxx.5, or Dxx.6 may be received as reception data. When Dxx.4 is transmitted as transmission data, as is clear from FIG. 3E, Dxx.1, Dxx.2, Dxx.3, Dxx.4, Dxx.5, or Dxx.6 may be received as reception data. When Dxx.7 is transmitted as transmission data, as is clear from FIG. 3H, Dxx.1, Dxx.2, Dxx.3, Dxx.5, Dxx.6, or Dxx.7 may be received as reception data.

As a sequence ID 112, a code that is capable of correcting a 1-bit error to the correct sequence ID 112, the error being caused by transmission in transmission of the transmission packet 100 to the second transmitting and receiving apparatus 4, specifically, plural predetermined codes, such as 96 combinations of IDs, namely, D0.0 to D31.0 (see FIG. 3A), D0.4 to D31.4 (see FIG. 3E), and D0.7 to D31.7 (see FIG. 3H), are used in a predetermined order, such as the order from a code with a smaller numeral to a code with a greater numeral, and these codes are repeatedly used. Accordingly, when the 8B/10B converters 23A, 23B, and 23C convert the sequence ID 112 from 8-bit data to 10-bit data and send the 10-bit data, even if an error occurs in any one of 10 bits, the error may be detected without receiving the error as a wrong sequence ID, and the error may be corrected to the correct sequence ID 112. When an NIT error occurs in a sequence ID at the time of re-transmission, that error may not be corrected; thus, re-re-transmission is requested.

Operation of First Exemplary Embodiment

Figure 5A:
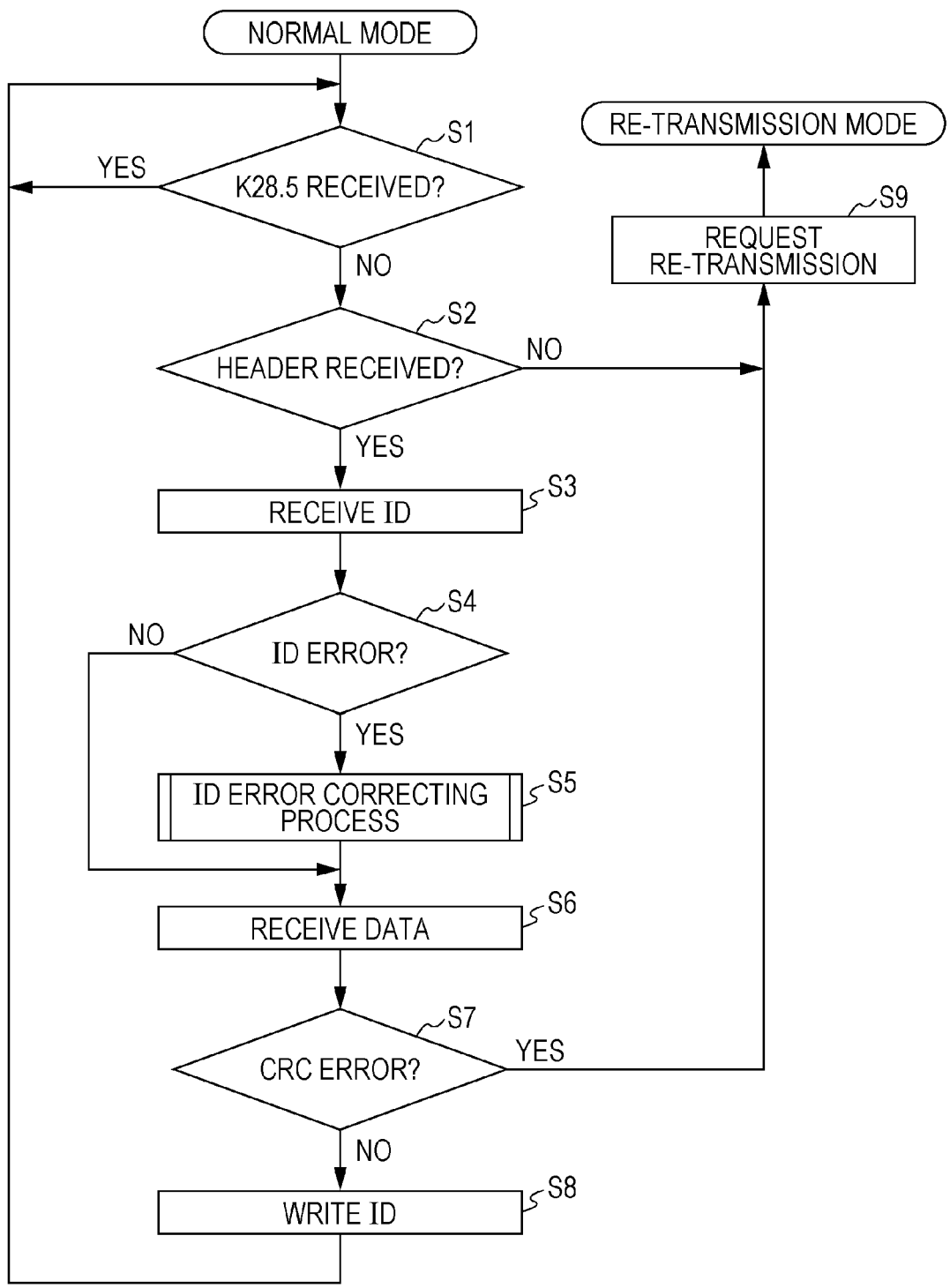
FIG. 5A is a flowchart illustrating an example of the operation of a second transmitting and receiving apparatus in a normal mode.
Figure 5B:
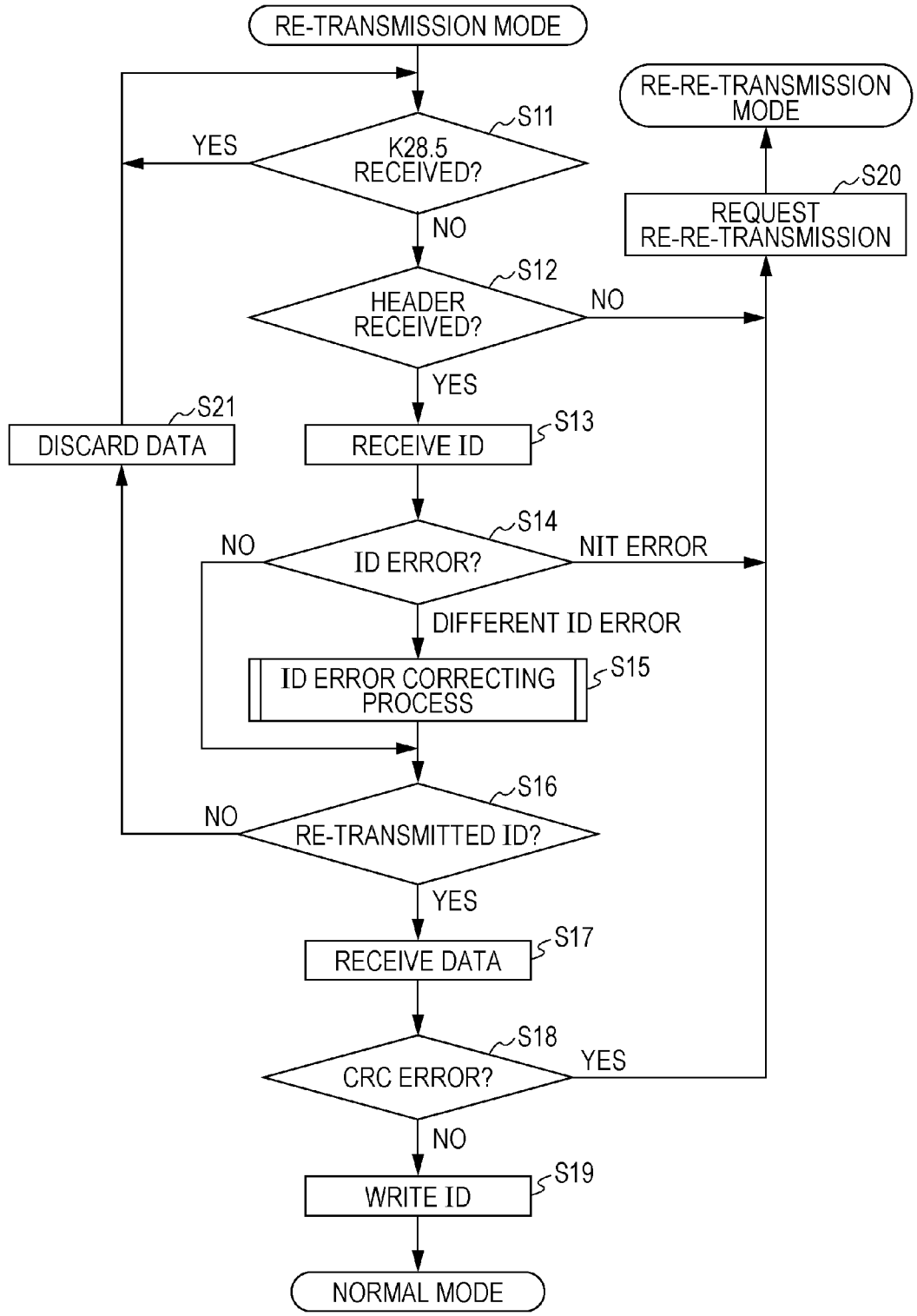
FIG. 5B is a flowchart illustrating an example of the operation of the second transmitting and receiving apparatus in a re-transmission mode.
Figure 6A:
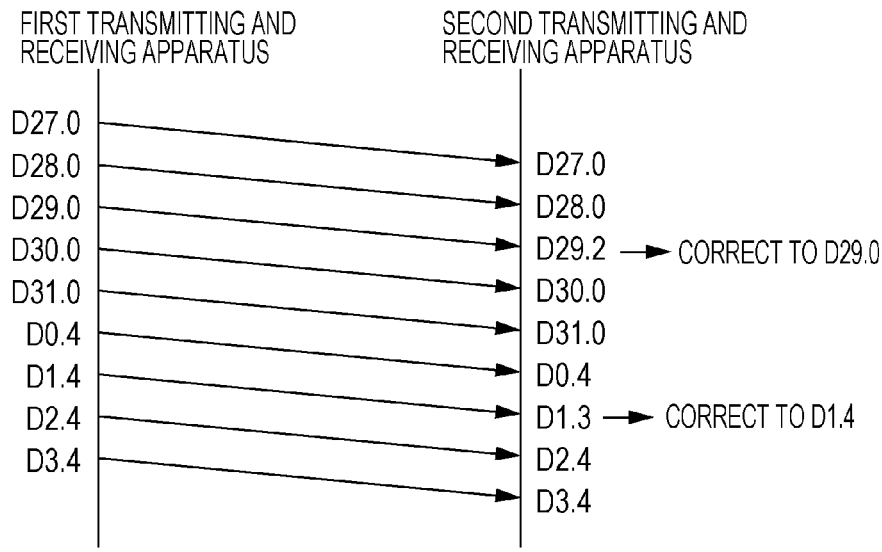
FIG. 6A is a timing chart illustrating a specific example of the normal mode.
Figure 6B:
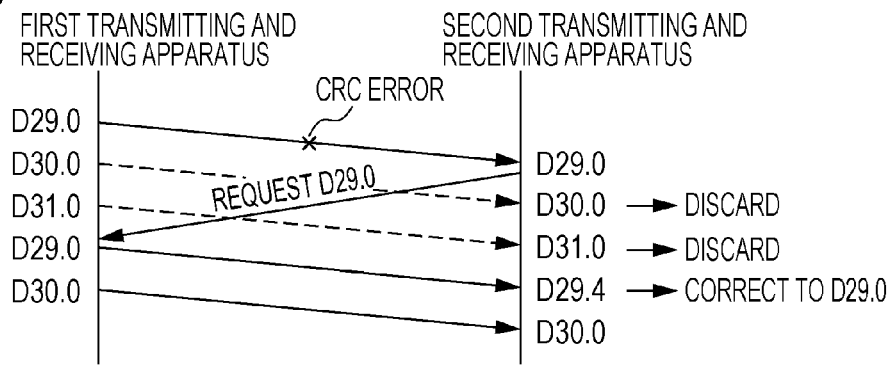
FIG. 6B is a timing chart illustrating a specific example of the re-transmission mode.
Figure 6C:
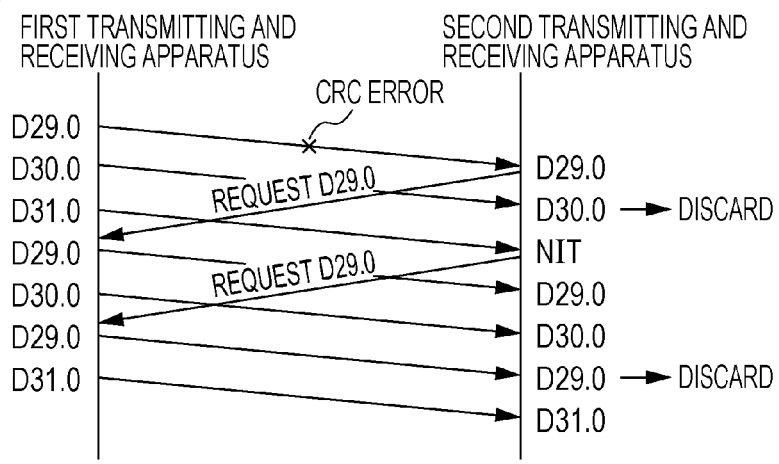
FIG. 6C is a timing chart illustrating another specific example of the normal mode.

Referring now to FIGS. 6A to 6C, an example of the operation according to the first exemplary embodiment will be described in accordance with the flowcharts depicted in FIGS. 5A and 5B. FIG. 5A illustrates an example of the operation of the second transmitting and receiving apparatus 4 in the normal mode, and FIG. 5B illustrates an example of the operation of the second transmitting and receiving apparatus 4 in the re-transmission mode. FIG. 6A illustrates a specific example of the normal mode. FIG. 6B illustrates a specific example of the re-transmission mode. FIG. 6C illustrates another specific example of the re-transmission mode.

The CRC generators 221A, 221B, and 221C of the first transmitting and receiving apparatus 2 generate a CRC code 130 by performing calculation on the basis of transmission data 120, which is output from the input-and-output controller 21. The transmission packet generator 22 generates a transmission packet 100 by attaching a header 110, the CRC code 130, and an end packet 140 to the data 120 to be transferred. At this time, as sequence IDs 112, D0.0 to D31.0, D0.4 to D31.4, and D0.7 to D31.7 illustrated in FIGS. 3A, 3E, and 3H are repeatedly used.

The transmission packet 100 generated by the transmission packet generator 22 is 8B/10B-converted by the 8B/10B converters 23A, 23B, and 23C, from 8-bit data to 10-bit data. The 10-bit data is converted from parallel data to serial data by the parallel/serial converters 24A, 24B, and 24C. The serial data is transmitted from the first transmitting and receiving apparatus 2 to the second transmitting and receiving apparatus 4 via the first lane 31, the second lane 32, and the third lane 33.

(1) Normal Mode

The second transmitting and receiving apparatus 4 receives K28.5, which is an idle signal, until receiving the transmission packet 100 (S1). Upon receipt of the transmission packet 100 by the second transmitting and receiving apparatus 4, the transmission packet 100 is converted by the serial/parallel converters 41A, 41B, and 41C from serial data to parallel data. The parallel data is 8B/10B inverse-converted by the 10B/8B converters 42A, 42B, and 42C from 10-bit data to 8-bit data, and the 8-bit data is input to the ID error detecting and correcting units 43A, 43B, and 43C.

Upon receipt of a signal other than an idle signal, the ID error detecting and correcting units 43A, 43B, and 43C determine whether the signal is the header 110 (S2). Since the received signal, other than the idle signal, is the K28.2 code indicating the start packet 111, it is determined that the signal is the header 110 (YES in S2). The ID error detecting and correcting units 43A, 43B, and 43C receive the sequence ID 112 included in the header 110 (S3).

The ID error detecting and correcting units 43A, 43B, and 43C determine whether the sequence ID 112 is an error (ID error) (S4). When an ID error is detected (YES in S4), the ID error detecting and correcting units 43A, 43B, and 43C correct the wrong sequence ID to the correct sequence ID 112 (S5), and output the transmission packet 100 to the CRC units 44A, 44B, and 44C (S6). When no ID error is detected (NO in S4), the ID error detecting and correcting units 43A, 43B, and 43C do not correct the sequence ID 112, and output the transmission packet 100 to the CRC units 44A, 44B, and 44C (S6).

For example, as illustrated in FIG. 6A, it is assumed that "D27.0", "D28.0", "D29.0", "D30.0", "D31.0", "D0.4", "D1.4", "D2.4" and "D3.4" are transmitted as sequence IDs 112 from the first transmitting and receiving apparatus 2. When the sequence ID 112 of the thirdly received transmission packet 100 by the second transmitting and receiving apparatus 4 becomes "D29.2" instead of "D29.0" due to an error in the transmission, the ID error correcting and detecting units 43A, 43B, and 43C determine that "D29.2" is not in the predetermined code, and correct "D29.2" to "D29.0", which is the correct code. When the sequence ID 112 of the seventhly received transmission packet 100 by the second transmitting and receiving apparatus 4 becomes "D1.3" instead of "D1.4" due to an error in the transmission, the ID error correcting and detecting units 43A, 43B, and 43C determine that "D1.3" is not in the predetermined code, and correct "D1.3" to "D1.4", which is the correct code.

The CRC units 44A, 44B, and 44C perform CRC calculation of the CRC code 130 (S7). If there is no CRC error (NO in S7), the CRC units 44A, 44B, and 44C determine that the reception is normal and write the sequence ID 112 to a memory (S8). The CRC units 44A, 44B, and 44C merge the data 120 and output the data 120 to the input-and-output controller 48. If there is a CRC error (YES in S7), the CRC units 44A, 44B, and 44C read, from the memory, the sequence ID 112 that has been written the last time, and notify the re-transmission requesting unit 45 of the CRC error, and the sequence ID 112 obtained by incrementing the read sequence ID.

In order to request re-transmission of a transmission packet with the sequence ID 112 given in the notification, the re-transmission requesting unit 45 generates a packet for requesting re-transmission, and the mode changes to the re-transmission mode (S9). The packet for requesting re-transmission is 8B/10B-converted by the 8B/10B converter 46 from 8-bit data to 10-bit data, and the 10-bit data is converted by the parallel/serial converter 47 from parallel data to serial data. The serial data is transmitted from the second transmitting and receiving apparatus 4 to the first transmitting and receiving apparatus 2 via the fourth lane 34 of the transmission path 3.

For example, as illustrated in FIG. 6B, it is assumed that "D29.0", "D30.0", and "D31.0" are transmitted as sequence IDs 112 from the first transmitting and receiving apparatus 2. When the CRC code 130 of the firstly received transmission packet 100 by the second transmitting and receiving apparatus 4 becomes a CRC error due to an error in the transmission, the re-transmission requesting unit 45 requests re-transmission of the packet whose sequence ID is "D29.0".

When the first transmitting and receiving apparatus 2 receives a packet for requesting re-transmission, the packet for requesting re-transmission is converted by the serial/parallel converter 25 from serial data to parallel data, and the parallel data is 8B/10B inverse-converted by the 10B/8B converter 26 from 10-bit data to 8-bit data. The 8-bit data is input to the re-transmission controller 27.

The re-transmission controller 27 extracts the sequence ID 112 from the packet for requesting re-transmission, which is transmitted from the second transmitting and receiving apparatus 4 to the first transmitting and receiving apparatus 2. The re-transmission controller 27 instructs the input-and-output controller 21 to re-transmit a packet with the extracted sequence ID 112.

The input-and-output controller 21 sends data corresponding to the sequence ID 112, which has been held in the transmission buffer for re-transmission, to the transmission packet generator 22. Instructed to generate a transmission packet, the transmission packet generator 22 generates a transmission packet. The re-generated transmission packet 100 is subjected to 8B/10B conversion and parallel/serial conversion, as has been described above, and is transmitted to the second transmitting and receiving apparatus 4.

(3) Re-Transmission Mode

The second transmitting and receiving apparatus 4 receives K28.5, which is an idle signal, until receiving the transmission packet 100 (S11). Upon receipt of the transmission packet 100 by the second transmitting and receiving apparatus 4, the transmission packet 100 is converted by the serial/parallel converters 41A, 41B, and 41C from serial data to parallel data. The parallel data is 8B/10B inverse-converted by the 10B/8B converters 42A, 42B, and 42C from 10-bit data to 8-bit data, and the 8-bit data is input to the ID error detecting and correcting units 43A, 43B, and 43C.

Upon receipt of a signal other than an idle signal, the ID error detecting and correcting units 43A, 43B, and 43C determine whether the signal is the header 110 (S12). Since the received signal, other than the idle signal, is the K28.2 code indicating the start packet 111, it is determined that the signal is the header 110 (YES in S12). The ID error detecting and correcting units 43A, 43B, and 43C receive the sequence ID 112 included in the header 110 (S13).

The ID error detecting and correcting units 43A, 43B, and 43C determine whether the sequence ID 112 is an ID error (S14). When an ID error is detected, if that error is an ID error other than an NIT error, the ID error detecting and correcting units 43A, 43B, and 43C correct the wrong sequence ID to the correct sequence ID 112 (S15), and determine whether the received sequence ID 112 matches a re-transmission ID (the sequence ID 112 written to the memory upon abnormal reception) (S16). If the received sequence ID 112 matches the re-transmission ID (YES in S16), the ID error detecting and correcting units 43A, 43B, and 43C output the transmission packet 100 to the CRC units 44A, 44B, and 44C (S17). When no ID error is detected (NO in S14), the ID error detecting and correcting units 43A, 43B, and 43C determine whether the received sequence ID 112 is the re-transmission ID (S16).

The CRC units 44A, 44B, and 44C perform CRC calculation of the CRC code 130 (S18). If there is no CRC error (NO in S18), the CRC units 44A, 44B, and 44C determine that the reception is normal and write the sequence ID 112 to the memory (S19). The CRC units 44A, 44B, and 44C merge the data 120 and output the data 120 to the input-and-output controller 48. If there is a CRC error (YES in S18), the CRC units 44A, 44B, and 44C read, from the memory, the sequence ID 112 that has been written the last time, and notify the re-transmission requesting unit 45 of the CRC error, and the sequence ID 112 obtained by incrementing the read sequence ID.

In order to request again re-transmission of a transmission packet with the sequence ID 112 given in the notification, the re-transmission requesting unit 45 generates a packet for requesting re-transmission, and the mode changes to the re-re-transmission mode (S20). The packet for requesting re-transmission is 8B/10B-converted by the 8B/10B converter 46 from 8-bit data to 10-bit data, and the 10-bit data is converted by the parallel/serial converter 47 from parallel data to serial data. The serial data is transmitted from the second transmitting and receiving apparatus 4 to the first transmitting and receiving apparatus 2 via the fourth lane 34 of the transmission path 3.

When an ID error is detected in step S14, if that error is an NIT error, the sequence ID 112 is written to the memory, and the mode changes to the re-re-transmission mode (S20). If the sequence ID 112 does not match the re-transmission ID in step S16 (NO in S16), the data is discarded (S21).

For example, as illustrated in FIG. 6B, when a re-transmission request is made since the CRC code 130 of the first "D29.0" is a CRC error, the ID error detecting and correcting units 43A, 43B, and 43C of the second transmitting and receiving apparatus 4 discard transmission packets 100 with "D30.0" and "D31.0" that arrive before "D29.0" arrives, which has been requested to be re-transmitted. The received "D29.4" is corrected to "D29.0".

For example, as illustrated in FIG. 6C, it is assumed that "D29.0", "D30.0", and "D31.0" are transmitted as sequence IDs 112 from the first transmitting and receiving apparatus 2. When the CRC code 130 of the firstly received transmission packet 100 by the second transmitting and receiving apparatus 4 becomes a CRC error due to an error in the transmission, the re-transmission requesting unit 45 requests re-transmission of the packet whose sequence ID is "D29.0".

The ID error detecting and correcting units 43A, 43B, and 43C discard a transmission packet 100 with "D30.0" that arrives before "D29.0" arrives, which has been requested to be re-transmitted. Because the sequence ID 112 of the next received transmission packet 100 is an NIT error, this may be "D29.0", which has been requested to be re-transmitted. Thus, "D29.0" is requested to be again re-transmitted.

The first transmitting and receiving apparatus 2 transmits "D29.0" and "D30.0" in response to the first re-transmission request, and then transmits "D29.0" and "D31.0" in response to the second re-transmission request for "D29.0".

The ID error detecting and correcting units 43A, 43B, and 43C of the second transmitting and receiving apparatus 4 receive "D29.0" and "D30.0", and then again receive "D29.0". Therefore, the ID error detecting and correcting units 43A, 43B, and 43C discard this "D29.0", and receive the next "D31.0".

Comparative Example

Figure 7A:
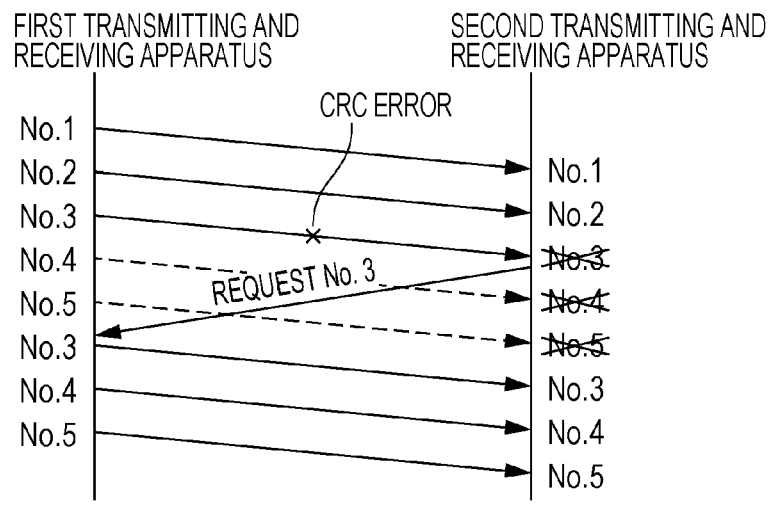
FIGS. 7A to 7E are timing charts for a comparative example.

FIGS. 7A to 7E are timing charts for a comparative example. Referring to FIG. 7A, items of data are transmitted from the first transmitting and receiving apparatus 2 in the order of sequence IDs. If a CRC error occurs at No. 3, the second transmitting and receiving apparatus 4 requests re-transmission of No. 3. In response to the re-transmission request, the first transmitting and receiving apparatus 2 re-transmits items of data, starting from No. 3, in the order of sequence IDs, and the second transmitting and receiving apparatus 4 is capable of receiving the data in the correct order.

Figure 7B:
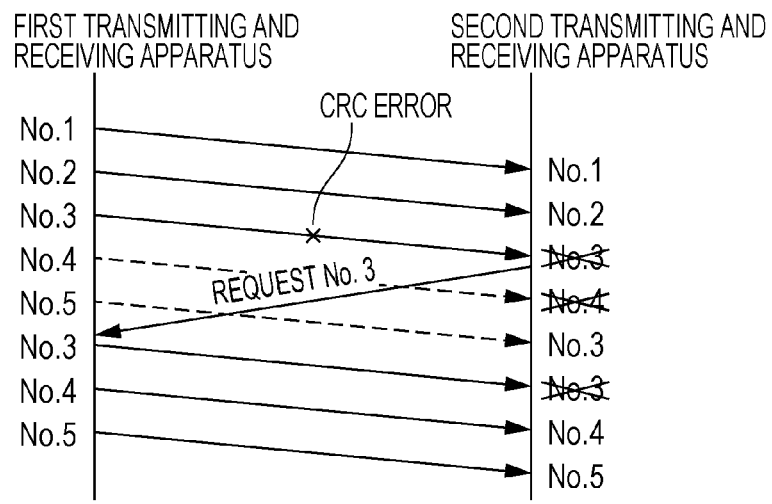

Referring to FIG. 7B, items of data are transmitted from the first transmitting and receiving apparatus 2 in the order of sequence IDs. If a CRC error occurs at No. 3, the second transmitting and receiving apparatus 4 requests re-transmission of No. 3. In response to the re-transmission request, the first transmitting and receiving apparatus 2 re-transmits items of data, starting from No. 3, in the order of sequence IDs. If the sequence ID turns into No. 3 due to transmission of No. 5, which is immediately before the arrival of the re-transmission request, the second transmitting and receiving apparatus 4 is unable to distinguish this No. 3 from the re-transmitted No. 3, and may mistakenly receive data of No. 5 as data of No. 3. Further, the correct No. 3 is discarded.

Figure 7C:
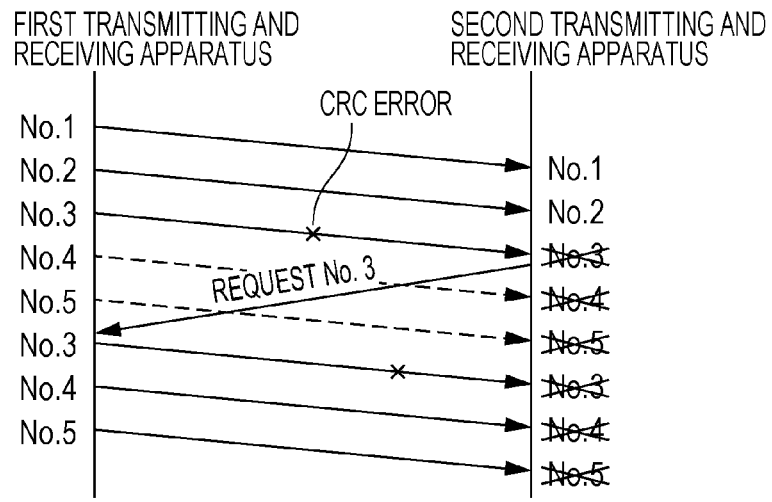

Referring to FIG. 7C, if a CRC error occurs at No. 3, the second transmitting and receiving apparatus 4 requests re-transmission of No. 3. In response to the re-transmission request, the first transmitting and receiving apparatus 2 re-transmits items of data, starting from No. 3, in the order of sequence IDs. However, if the sequence ID turns into No. 6, this No. 6 is undistinguishable from No. 6 that has been consecutively transmitted before the re-transmission request arrives, and hence, this No. 6 is discarded.

Figure 7D:
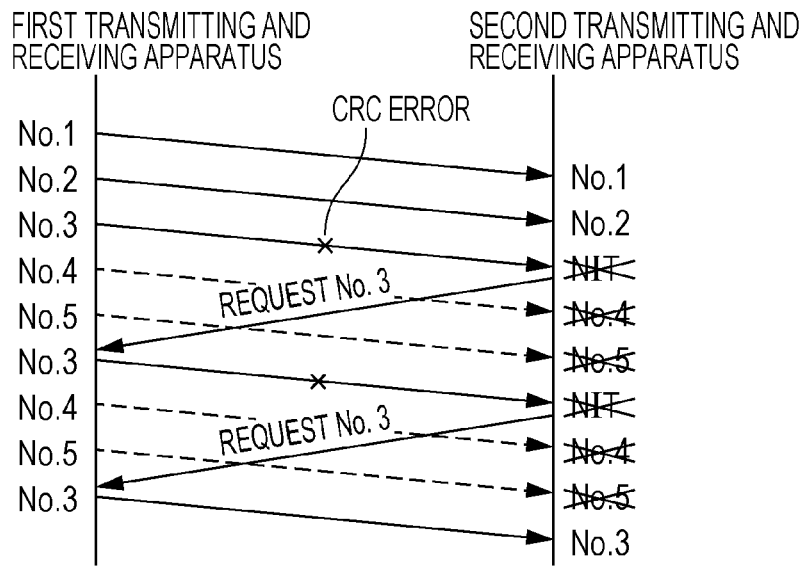

Referring to FIG. 7D, if a CRC error and an NIT error occur at No. 3, the second transmitting and receiving apparatus 4 requests re-transmission of No. 3. In response to the re-transmission request, the first transmitting and receiving apparatus 2 re-transmits items of data, starting from No. 3, in the order of sequence IDs. If the sequence ID causes an NIT error, No. 3 is requested to be re-re-transmitted.

Figure 7E:
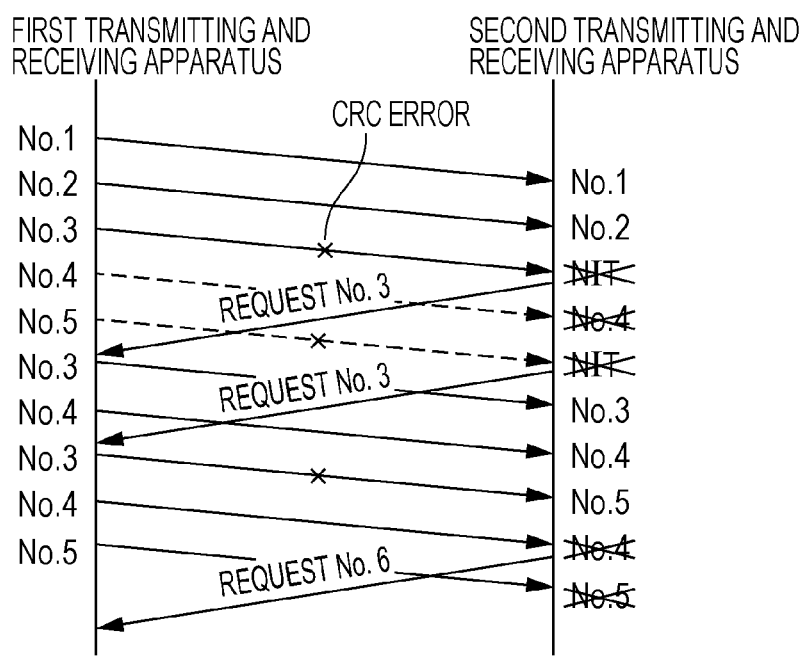

Referring to FIG. 7E, if a CRC error and an NIT error occur at No. 3, the second transmitting and receiving apparatus 4 requests re-transmission of No. 3. In response to the re-transmission request, the first transmitting and receiving apparatus 2 re-transmits items of data, starting from No. 3, in the order of sequence IDs. If the sequence ID immediately before the arrival of the re-transmission request causes an NIT error, No. 3 is requested to be re-re-transmitted. If No. 3 that has been requested to be re-re-transmitted turns into No. 5, the receiving side is unable to distinguish this No. 5 from the consecutively transmitted No. 5, and may mistakenly receive the wrong data.

As illustrated in FIGS. 7B and 7C, when a transmission error occurs and the sequence ID turns into a different numeral, signals are not correctly transmitted. When the sequence ID causes an NIT error, that error may be handled by making a re-transmission request or a re-re-transmission request. However, if the sequence ID turns into a different numeral, the sequence ID may be wrongly recognized.

Second Exemplary Embodiment

Figure 8:
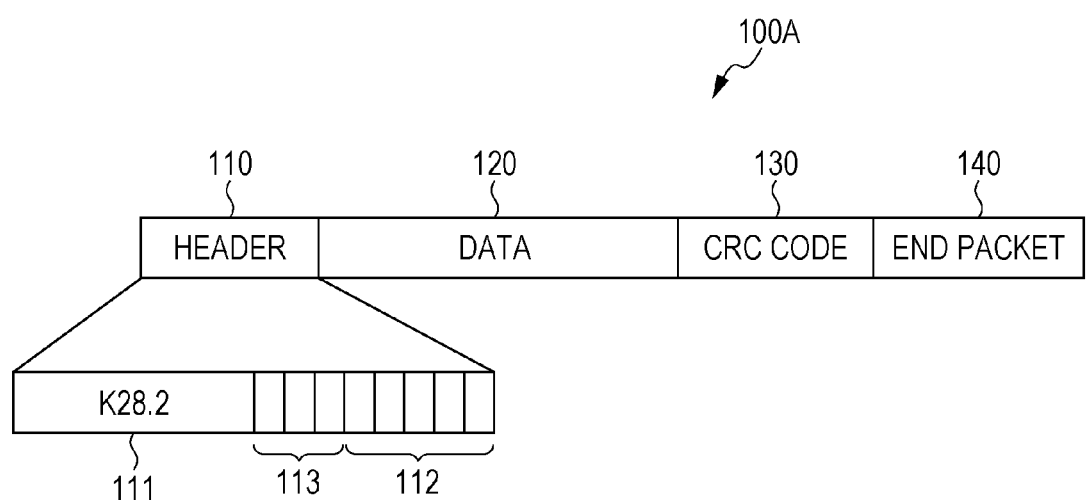
FIG. 8 is a diagram illustrating an example of the configuration of a transmission packet according to a second exemplary embodiment of the present invention.

FIG. 8 is a diagram illustrating an example of the configuration of a transmission packet according to a second exemplary embodiment of the invention. Since the transmitting and receiving system is the same as that in FIG. 1, an illustration thereof is omitted.

A transmission packet 100A according to the second exemplary embodiment is different in the configuration of the header 110 from the first exemplary embodiment; however, the remaining configuration is the same as that in the first exemplary embodiment. That is, the transmission packet 100A according to the second exemplary embodiment has a fixed length, and includes a 2-byte header 110, 256-byte data 120, a 2-byte CRC code 130, and a 2-byte end packet 140 indicating the end of the transmission packet 100A. The header 110 includes a start packet 111 including a K code, such as K28.2, which indicates the beginning of the transmission packet 100A, a 3-bit lane number 113, and a 5-bit sequence ID 112. The lane number 113 and the sequence ID 112 are examples of identification information of the transmission packet 100A.

Even when a 1-bit error is caused by transmission in transmission of the transmission packet 100A to the second transmitting and receiving apparatus 4, a code that is capable of correcting the wrong sequence ID to the correct sequence ID 112, specifically, plural predetermined codes, such as the 5 least significant bits of the IDs D0.0 to D31.0 for the first lane 31 (see FIG. 3A), D0.4 to D31.4 for the second lane 32 (see FIG. 3E), and D0.7 to D31.7 for the third lane 33 (see FIG. 3H), are used as sequence IDs 112 in a predetermined order, such as the order from a code with a smaller numeral to a code with a greater numeral, and these codes are repeatedly used.

The ID error detecting and correcting unit 43A, corresponding to the first lane 31, may mistakenly receive Dxx.1, Dxx.2, Dxx.5, or Dxx.6. In such a case, Dxx.1, Dxx.2, Dxx.5, or Dxx.6 is corrected to Dxx.0.

The ID error detecting and correcting unit 43B, corresponding to the second lane 32, may mistakenly receive Dxx.1, Dxx.2, Dxx.3, Dxx.5, or Dxx.6. In such a case, Dxx.1, Dxx.2, Dxx.3, Dxx.5, or Dxx.6 is corrected to Dxx.4.

The ID error detecting and correcting unit 43C, corresponding to the third lane 33, may mistakenly receive Dxx.1, Dxx.2, Dxx.3, Dxx.5, or Dxx.6. In such a case, Dxx.1, Dxx.2, Dxx.3, Dxx.5, or Dxx.6 is corrected to Dxx.7.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

For example, one or some of the components according to the exemplary embodiments may be omitted without departing from the scope of the invention. In the flows according to the exemplary embodiments, a step or steps may be added, deleted, changed, and/or replaced. A program used in the exemplary embodiments may be stored in a recording medium such as a compact-disc read-only memory (CD-ROM) and may be provided.

What is claimed is:

1. A transmitting and receiving system comprising:
a first transmitting and receiving apparatus; and
a second transmitting and receiving apparatus,
wherein the first transmitting and receiving apparatus includes:
a generating unit that generates a packet for transmission by attaching a header comprising packet identification information to transmission data to which an error detection code is attached,
wherein the packet identification information comprises a code that is capable of indicating a 1-bit error caused by transmission of the packet for transmission; and
a transmitting unit that converts a number of bits of the packet for transmission and then transmits a converted packet, and
wherein the second transmitting and receiving apparatus includes:
a receiving unit that receives the transmitted packet transmitted by the transmitting unit and subjects the received packet to inverse conversion of the number of bits; and
a correcting unit that detects a 1-bit error in the packet identification information of the inverse-converted packet, and corrects the detected 1-bit error.

2. The transmitting and receiving system according to claim 1, wherein the packet identification information comprises a plurality of predetermined codes in a predetermined order, and
wherein the correcting unit detects and corrects the 1-bit error in the packet identification information on the basis of the plurality of predetermined codes and the predetermined order.

3. A non-transitory computer readable medium storing a program causing a computer to execute a process, the process comprising:
generating a packet for transmission by attaching a header comprising packet identification information to transmission data to which an error detection code is attached,
wherein the packet identification information comprises a code that is capable of indicating 1-bit error caused by transmission of the packet for transmission;
converting a number of bits of the packet for transmission and transmitting a converted packet;
receiving the transmitted packet and subjecting the received packet to inverse conversion of the number of bits;
detecting a 1-bit error in the packet identification information of the inverse-converted packet; and
correcting the detected 1-bit error.

4. A transmitting and receiving method comprising:
generating a packet for transmission by attaching a header comprising packet identification information to transmission data to which an error detection code is attached,
wherein the packet identification information comprises a code that is capable of indicating a 1-bit error caused by transmission of the packet for transmission;
converting a number of bits of the packet for transmission and transmitting a converted packet;
receiving the transmitted packet and subjecting the received packet to inverse conversion of the number of bits;
detecting a 1-bit error in the packet identification information of the inverse-converted packet; and
correcting the detected 1-bit error.

* * * * *